United States Patent [19]

Hovorak

[11] 3,960,114

[45] June 1, 1976

[54] HOG OILER

[76] Inventor: William P. Hovorak, 1023 W. 16th St., Wellington, Kans. 67152

[22] Filed: May 27, 1975

[21] Appl. No.: 580,908

[52] U.S. Cl. .............................................. 119/157
[51] Int. Cl.² ................. A01K 13/00; A01K 29/00
[58] Field of Search .................................... 119/157

[56] References Cited
UNITED STATES PATENTS

| | | | |
|---|---|---|---|
| 1,151,883 | 8/1915 | Jones | 119/157 |
| 1,270,425 | 6/1918 | Lowes | 119/157 |
| 1,390,611 | 9/1921 | Haisley | 119/157 |
| 1,886,635 | 11/1932 | Brown | 119/157 |
| 2,888,906 | 6/1959 | Delp | 119/157 |
| 3,156,216 | 11/1964 | Poage | 119/157 |

*Primary Examiner*—Hugh R. Chamblee
*Attorney, Agent, or Firm*—John H. Widdowson

[57] ABSTRACT

A livestock treater has a rubbing assembly tiltably mounted and a reservoir for liquid. The rubbing assembly is communicably connected to the reservoir through a normally closed valve. The valve is openable upon tilting of the rubbing assembly to let liquid flow from the reservoir onto the rubbing assembly.

10 Claims, 16 Drawing Figures

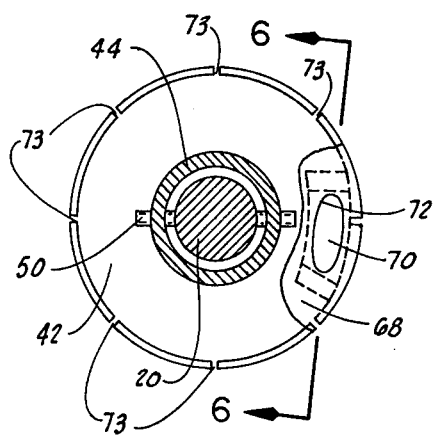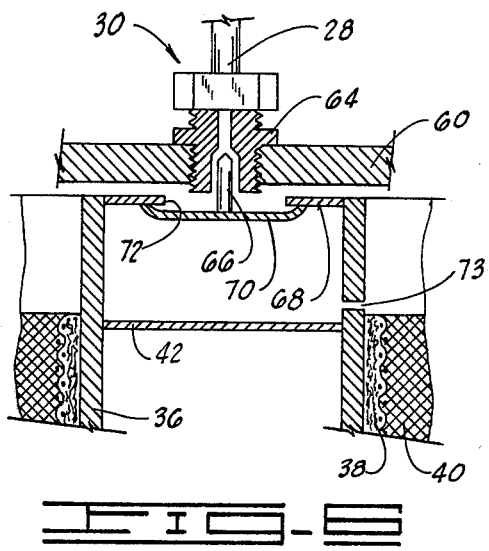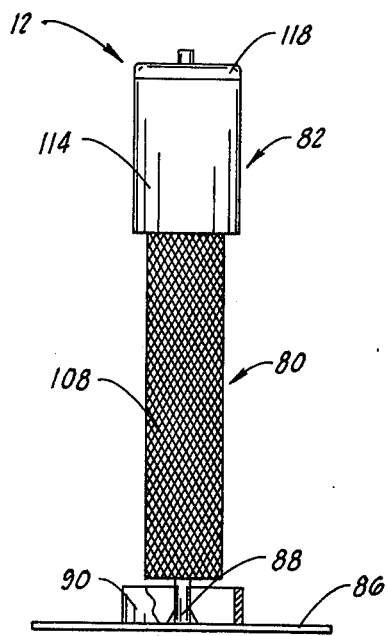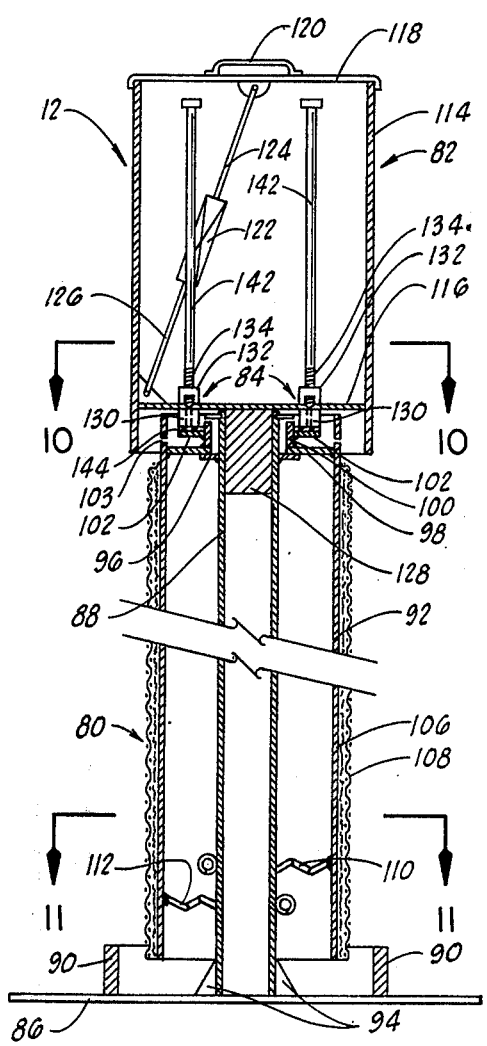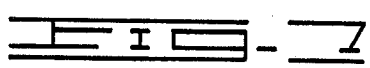

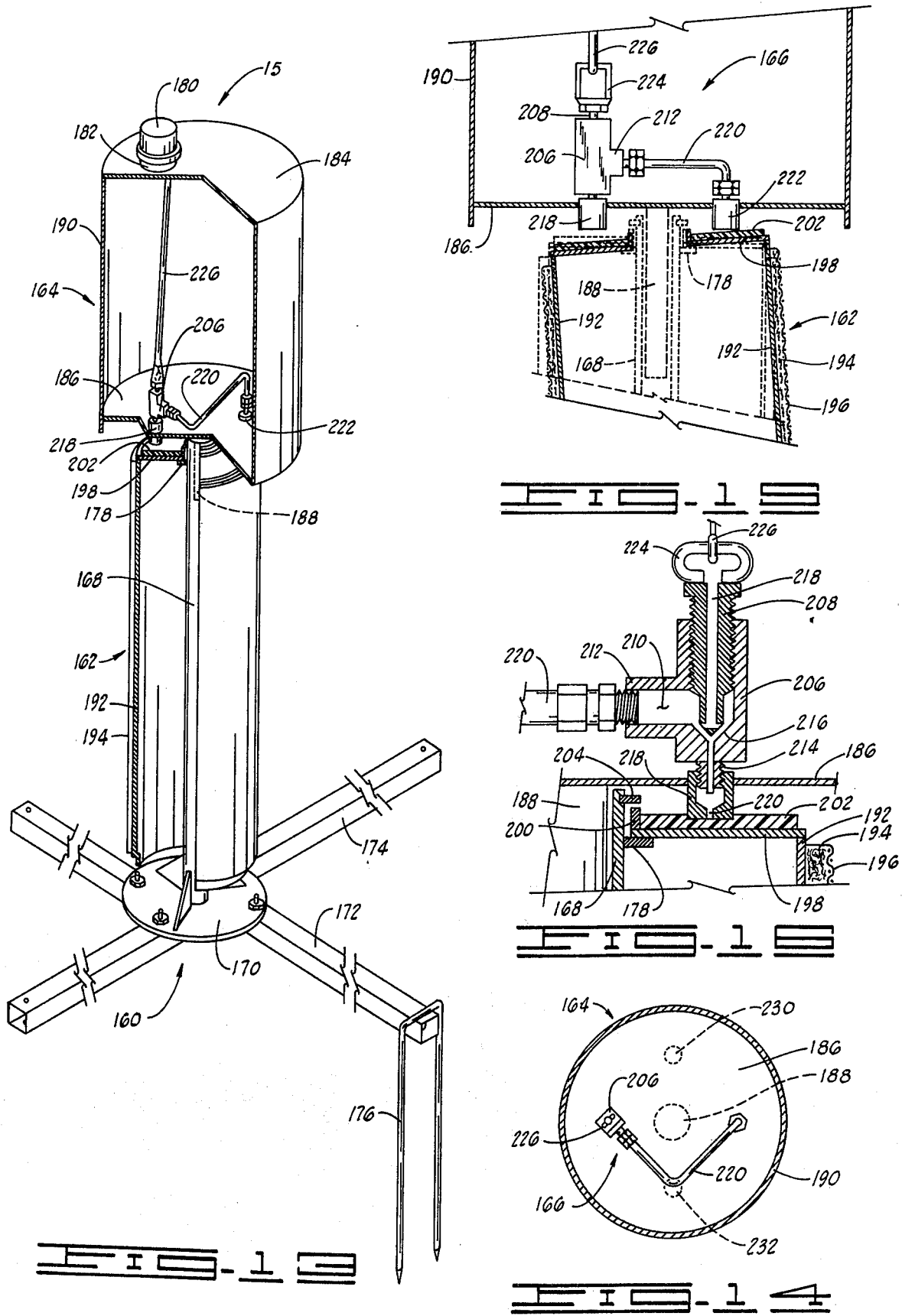

HOG OILER

BACKGROUND OF THE INVENTION

This invention is related to livestock treaters of the type wherein the livestock rubs against a member that is saturated with a treating fluid. More specifically, the invention is related to hog oilers and cattle oilers. Numerous types of livestock treaters of the rubbing type are known in the prior art as operable to dispense treating fluid such as oil and insecticide and mixtures thereof onto the skin of livestock such as hogs, cattle, etc. However, the prior art devices are deficient in that they are not always operated properly by the rubbing motion of the livestock. For instance, some prior art devices require vertical motion of a rubbing surface to activate the mechanism to dispense additional fluid onto the rubbing surface to replace that which is rubbed away. With this type of device the rubbing surface often becomes dry because the animals rubbing does not always produce the vertical motion of the rubbing surface that is necessary to cause the fluid to be dispensed hence the effectiveness of the treater is limited. Other known prior art livestock treaters require an oscillating motion of the rubbing surface to cause the fluid to be dispensed onto the rubbing surface. With these prior art rubbing devices the animal is likely to push against the rubbing surface and not release it until he is through scratching therefore the rubbing surface is not moved in the oscillating manner that is required to cause the treating fluid to be dispensed. Other known prior art livestock treaters have a rotating rubbing surface which when rotated causes fluid to be dispensed onto same. With this type of livestock treater if the animal rubs against the rubbing surface without significantly rotating it no fluid is dispensed hence the rubbing surface soon becomes dry and the device ineffective.

SUMMARY OF THE INVENTION

In preferred specific embodiments of this invention a livestock treater is provided which has a rubbing means that is tiltably mounted on an upright member. A reservoir is mounted on a frame portion of the structure and connected to the rubbing means through a valve. The valve is opened upon tilting of the rubbing means. The rubbing means has a cylindrical rubbing surface which when rubbed against by an animal will easily tilt thereby allowing liquid to flow from the reservoir onto the rubbing surface for replenishment of the liquid that is rubbed away by the animal. In one preferred specific embodiment, (1), of this invention the livestock treater is provided with rubbing means tiltably mounted on the upright member and positioned adjacent to a supporting structure for the reservoir. In another preferred specific embodiment, (2), of this invention a livestock treater is provided with the reservoir mounted atop the upright member over the upper end portion of the rubbing means. The second preferred specific embodiment of this invention is shown in one arrangement with the rubbing means close to the ground so it can be used by short animals such as hogs and it is shown in another arrangement with the rubbing means in an elevated position so that it can be used by taller animals such as cattle. In another specific embodiment, (3), the reservoir is mounted atop the upright member over the rubbing means with a plurality of members extending from the reservoir to support it on the rubbing means. Tilting the rubbing means displaces the reservoir and allows liquid to flow from the reservoir onto the rubbing means.

One object of this invention is to provide a livestock treater overcoming the aforementioned disadvantages of the prior art devices.

Still, one object of this invention is to provide a livestock treater structure having a rubbing means tiltably mounted on an upright member, a reservoir communicably connected to the rubbing means and a valve assembly which discharges from the reservoir onto the rubbing means upon tilting of the rubbing means.

Still another object of this invention is to provide a livestock treater structure which has a rubbing surface on a drum that is tiltably supported on an upright member along side an upright portion of a frame that has a reservoir mounted on an upper portion thereof. It is constructed so that tilting motion of the drum causes liquid to be dispensed onto the rubbing surface.

Another object of this invention is to provide a livestock treater which has a rubbing surface on a drum that is tiltably mounted on an upright member, a reservoir mounted atop the upright member, and a valve means openable upon tilting of the drum to dispense liquid from the reservoir onto the drum.

Various other objects, advantages, and features of the invention will become apparent to those skilled in the art from the following discussion, taken in conjunction with the accompanying drawings, in which:

DESCRIPTION OF THE DRAWINGS

FIG. 5 is a sectional view of the rubbing means and upright support member taken on line 5—5 of FIG. 3;

FIG. 6 is a sectional view of the valve, its supporting structure, and a portion of the drum with the view taken from the position of line 6—6 of FIG. 5;

FIG. 7 is an elevation view of another embodiment, (2), of the livestock treater of this invention;

FIG. 8 is a cross-sectional view of the embodiment of the livestock treater of this invention shown in FIG. 7;

Figure 1:
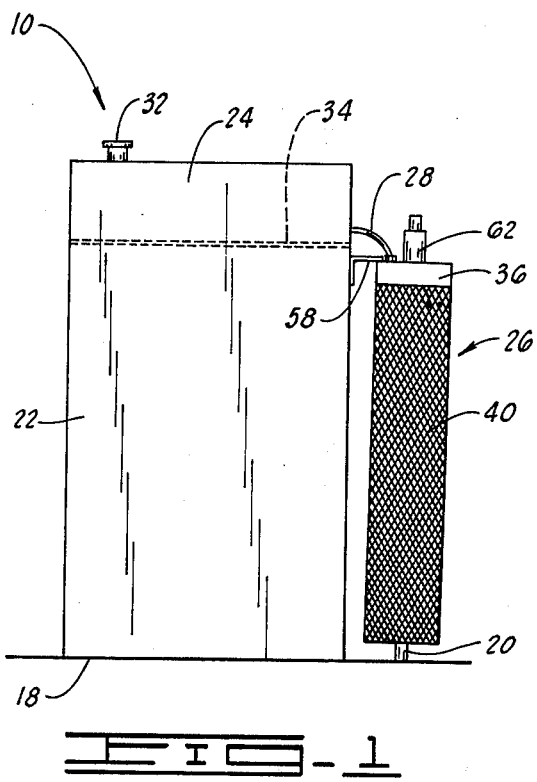
FIG. 1 is a side elevation view of an embodiment, (1), of the livestock treater. Dashed lines indicate the bottom of the reservoir.

FIG. 13 is a perspective view of another embodiment, (3), of the livestock treater of this invention with portions thereof cutaway for clarity;

FIG. 14 is a cross-sectional view of the reservoir taken transversely looking downward;

FIG. 15 is a fragmentary cross-sectional elevation view of the center portion of the livestock treater showing the rubbing means in a tilted position in dashed lines; and FIG. 16 is an enlarged cross-sectional elevation view of the flow control valve, its mounting and the associated support structure including a portion of the rubbing means.

The following is a discussion and description of preferred specific embodiments of the livestock treater structure of this invention, such being made with reference to the drawings, whereupon the same reference numerals are used to indicate the same or similar parts and/or structure. It is to be understood that such discussion and description is not to unduly limit the scope of the invention.

DESCRIPTION OF PREFERRED EMBODIMENTS

Figure 12:
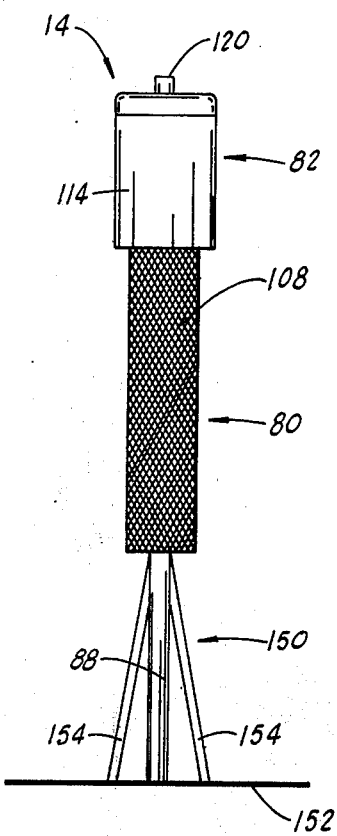
FIG. 12 is elevation view of a modification of the embodiment of the livestock treater shown in FIG. 7 with the rubbing surface in an elevated position relative to the ground.

Referring to the drawings in detail and in particular to FIGS. 1, 7, and 12. FIG. 1 shows an embodiment, (1), of the livestock treater of this invention, indicated generally at 10, which has the rubbing means supported along side of the frame and the reservoir supported atop the frame. FIG. 7 shows an embodiment, (2), of the livestock treater of this invention, indicated generally at 12, which has the reservoir mounted atop the rubbing means with the rubbing means positioned generally close to the ground. FIG. 12 shows a modification of the second named embodiment, (2), of the livestock treater of this invention. This modification is indicated generally at 14, and has the rubbing means in an elevated position above the ground. FIG. 13 shows a third embodiment, (3), which differs from the second embodiment, (2), in construction of the fluid control portion of the apparatus. This third embodiment is indicated generally at 15.

The first-named embodiment, (1), is shown in FIGS. 1-6 of the drawings. The livestock treater 10 has a frame comprised of a base 18, an upright member 20 secured to the base 18, and an upright portion 22 with a reservoir 24 mounted on top thereof. The livestock treater 10 also has a rubbing means, indicated generally at 26 tiltably mounted on the upright member 20, a conduit 28 communicably connecting the reservoir 24 and the rubbing means 26, and a valve means 30 communicably connected in the conduit and positioned above the rubbing means 26.

Figure 3:
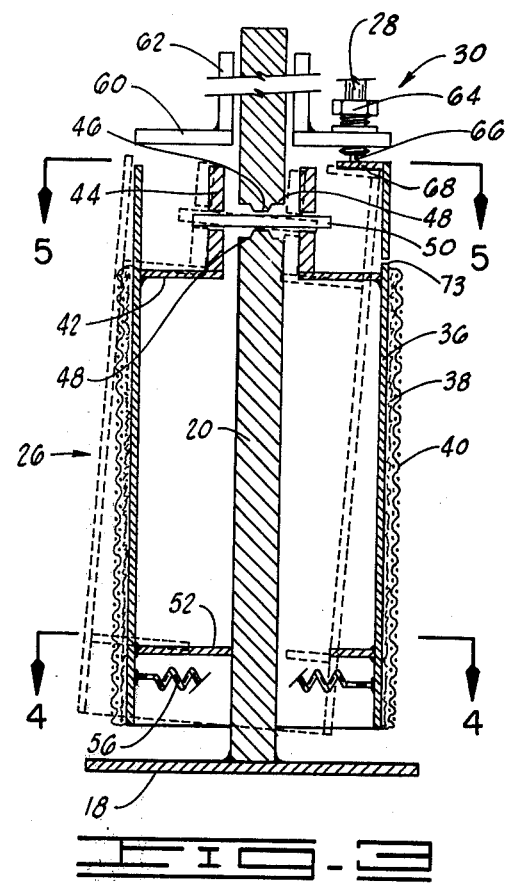
FIG. 3 is a sectional view of the rubbing means, upright support member, valve means and supporting structure for the embodiment of the livestock treater shown in FIG. 1. The drum is shown in a tilted position in dashed lines.
Figure 2:
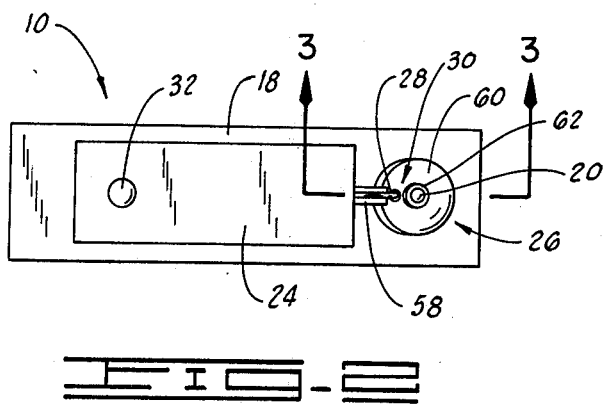
FIG. 2 is a top plan view of the embodiment of the livestock treater shown in FIG. 1.

The upright portion 22 of the frame which supports the reservoir 24 preferably has a rectangular box-like structure extending upward from the base 18. The reservoir 24 is constructed in the upper portion of the upright frame portion 22 with the inlet thereof 32 being on the top and the bottom 34 being spaced below the top as shown by the dashed lines in FIG. 1. The conduit 28 has one end thereof communicably connected with the reservoir 24 at a lower portion thereof so that liquid stored in the reservoir will flow through the conduit by gravity. The upright member 20 is preferably rigidly secured to the base 18 and extends upward therefrom. The rubbing means 26 has a drum 36 which is tiltably mounted with the upper end portion of the upright member 20. Preferably, the drum 36 is an essentially hollow cylindrical member that has a mount in its upper end portion to mount same with the upright member 20. The exterior of the drum 36 is covered with a layer of porous material 38 that is enclosed in an open mesh material 40. Preferably, the porous material 38 is a fabric of fibrous material such as jute, hemp, flax or acrylic fibers or any suitable equivalent which can be saturated with oil or the like and temporarily retain such. In practice, acrylic material sometimes used for indoor/outdoor carpeting has been successfully used and such is preferred. Preferably, the mesh covering material 40 has a lattice-like appearance such as screen wire or expanded metal screening or any suitable equivalent. The mesh covering material 40 serves to retain the porous material 38 and to provide a scratching surface or rubbing surface for the animals to rub against. The interior of the upper portion of the drum 36 has a transverse baffle-like member 42 secured therein with a collar 44 extending upward from a central portion thereof forming an opening through the center portion of the drum for the upright member 20. The upright member 20 has an aperture transversely through the upper end portion thereof. This aperture has a narrow center portion 46 and enlarged outer end portions 48. The collar 44 has apertures therethrough in opposed relation to receive a pin for mounting the drum 36. A pin 50 is positioned through the apertures of the collar 44 and the aperture of the upright member 20 as shown in FIG. 3 to tiltably mount the drum 36 with the upper end portion of the upright member 20. The pin 50 fits loosely in the aperture in the upright member 20 so the drum 36 can tilt easily and so the drum can twist a small amount about the upright member 20. FIG. 3 shows the drum 36 in solid lines and an upright and substantially vertical position wherein the pin 50 is transverse to the upright member 20. FIG. 3 also shows the drum 36 in a tilted position in dashed lines. In the tilted position the pin 50 rests on the center portion 46 of the aperture in the upright member 20 as shown with the pin 50 angularly disposed in the aperture as shown.

Figure 4:
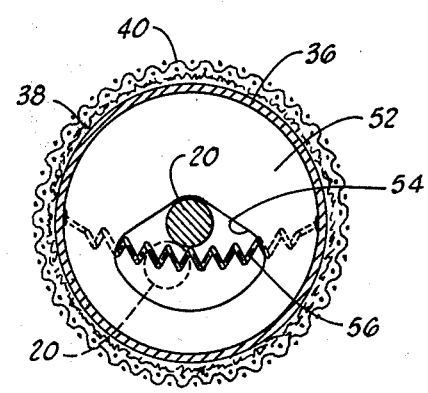
FIG. 4 is a sectional view of the rubbing means and support member taken on line 4—4 of FIG. 3. The support member is shown in dashed lines in a position in the aperture which it can assume when the drum is tilted.

The lower portion of the rubbing means 26 has a guide mounted inside the drum 36. The guide has a plate member 52 rigidly secured inside the drum 36 and positioned transversely as shown. The plate 52 has an eccentric aperture 54 therethrough preferably shaped substantially as shown in FIG. 4. The aperture 54 has a portion in the center portion of the drum and an outer portion radially disposed from its center portion near the wall of the drum 36 with the outer portion being curved and substantially larger than the inner portion. A resilient member 56, preferably a spring, is secured to the inside of the drum 36 as shown in FIG. 4 to position the upright member 20 in the center portion of the aperture 54. The spring 56 acts in tension to position the drum 36 and the upright member 20 as shown by the solid lines in FIG. 4. When an animal rubs against the exterior of the drum 36 the spring stretches as the drum tilts so the upright member 20 is moved in its position in the aperture 54. FIG. 4 shows in dashed lines the upright member 20 in a displaced position which is a position which it can assume when the drum 36 is tilted. The rubbing means 26 is mounted on the frame so that the outer or larger portion of the aperture 54 is on the same side of the upright member 20 as the reservoir and upright frame portion 22, so the lower portion of the drum can move away from the upright frame portion 22. When animals rub against the rubbing means 26 they exert forces on the exterior thereof which will cause the drum 36 to be tilted thus displacing the upright member 20 in the aperture 54 of the guide. When the animal no longer exerts a force on the rubbing means 26 the spring 56 will return the drum to the upright position as shown in solid lines in FIGS. 3 and 4. The rubbing means 26 is constructed so that an animal can rub against it from the sides of the structure or from the end. When an animal rubs against the rubbing surface from either side of the structure the upright member 20 will be displaced in the aperture 54 and the drum 36 tilted. If an animal pushes against the rubbing surface directly from the end of the structure the drum 36 will not be tilted until the animal moves slightly in a back and forth motion which twists the drum 36 in its mounting with the upright member 20.

The valve assembly 30 is on the upper end portion of the rubbing means 26 which includes a valve body and its supporting structure and a valve operator. The valve body supporting structure has a brace 58 extending in a cantilever fashion from the upright frame portion 22 which supports a plate 60 above the upper end of the drum 36. A collar 62 is secured to the plate 60 and fits over the upper end portion of the upright member 20. The valve body 64 is mounted through the plate 60 and connected by conduit 28 to the reservoir 24. The valve operator 66 extends from the lower end of the valve body 64 below the plate 60. Preferably, the valve 30 is a needle type valve as shown in FIG. 6 with the needle being the valve operator 66. The drum has a valve actuator on the upper end portion thereof which includes a plate member 68 that extends inwardly from the upper end of the drum 36 and a valve operator contact member 70 secured to the plate member 68 and positioned below an aperture 72 through the plate member 68. The valve actuator is shown in detail in FIGS. 3, 5, and 6. The valve operator 66 extends through the aperture 72 and contacts the operator contact member 70. When the drum 36 is in the essentially vertical upright position as shown in the solid lines of FIG. 3 the valve operator 66 closes the valve. When the drum 36 is tilted the valve operator 66 is moved downward in the valve body 64 which allows liquid to flow from the reservoir through the conduit 28 and valve body 64 into the upper portion of the drum 36. The liquid passes through the valve body 64, over the valve operator 66, through the aperture 72, over the member 70 and into a cavity of the upper end portion of the drum 36. A plurality of apertures 73 are provided in the sidewall of the drum 36 as indicated in FIG. 5 so that liquid in the cavity in the upper end portion of the drum 36 can flow through the apertures 73 onto the porous portion 38 of the rubbing means 26.

In the use and operation of this embodiment, (1), of the livestock treater of this invention the reservoir 24 is filled with oil or insecticide, or any other liquid which is desired by the user. When the rubbing means 26 is in the essentially vertical upright position the valve 30 is closed and no liquid will flow from the reservoir onto the rubbing means. When an animal rubs against the exterior of the rubbing means the valve 30 is opened and the liquid will flow into the cavity in the upper end portion of the rubbing means 26 and onto the exterior of the rubbing means so it can be transferred to the skin of the animal. After the livestock treater has been in operation a short time the porous material 38 on the exterior of the rubbing means 26 will become saturated with the liquid so that as animals rub against it the liquid which is rubbed away onto their skin is replenished. It is to be noted that with the livestock treater of this invention as long as the animal pushes against the rubbing means or rubs against it liquid is continually dispensed onto the rubbing surface to replenish that which is rubbed away on the animal. In practice, this livestock treater 10 has been successfully used with hogs where oil was dispensed.

Another embodiment, (2), of the livestock treater of this invention is shown in detail in FIGS. 7–11 on Sheets 2 and 3 of the drawings. The livestock treater 12 has a frame structure which supports a rubbing means 80 and a reservoir 82 on the top of the rubbing means 80. It also has a valve assembly 84 communicably connecting the reservoir 82 and the rubbing means 80. The rubbing means is tiltably mounted and the valve assembly 84 is constructed to release liquid from the reservoir 82 onto the rubbing means 80 when the rubbing means 80 is tilted.

Figure 9:
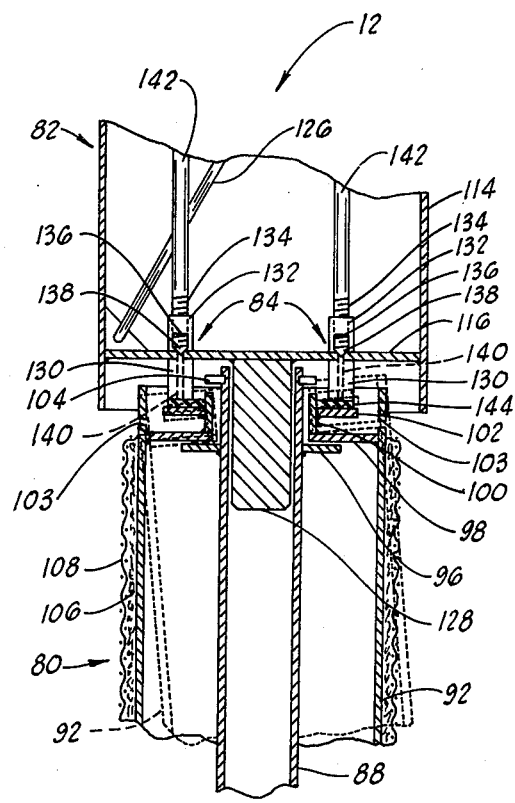
FIG. 9 is an enlarged cross-sectional view of the adjacent portions of the reservoir and rubbing means portion of the livestock treater shown in FIG. 7. The drum is shown in a tilted position in dashed lines.
Figure 10:
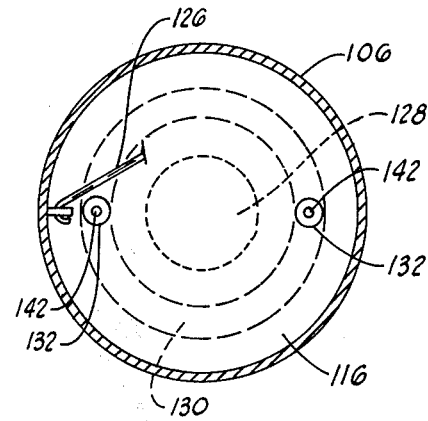
FIG. 10 is a cross-sectional view of the reservoir portion of the livestock treater shown in FIG. 8 with the view taken on line 10—10 of FIG. 8.

The frame structure of the livestock treater 12 has a base 86 with the upright member 88 rigidly secured thereto and extending upward therefrom. A drip reservoir is constructed on the base 86 and it has a collar 90 extending upward from the base 86 around the lower portion of the rubbing means 80 as shown in FIG. 7. The drip reservoir catches and holds excess liquid which runs off of the rubbing means 80. The rubbing means 80 has a drum 92 in the form of an essentially hollow cylindrical member which is the support for the rubbing surface and which is titably mounted on the upright member 88. The upright member 88 is rigidly secured to the base and it has braces 94 at the base 86. The upright member 88 is hollow at least in its upper end portion and it has a flange 96 extending outward therefrom at the upper end portion thereof. The drum 92 has an inwardly extending ring 98 rigidly secured in the upper end portion thereof. A collar 100 is secured to the inner portion of the ring 98 and extends therefrom in the direction of the upper end of the drum 92. The interior of the ring 98 and the collar 100 are sized substantially larger than the upright member 88 so they will slip over the upright member with substantial clearance as shown in FIGS. 8 and 9. The ring 98 is secured to the interior of the drum 92 with its aperture and the aperture of the collar 100 being in the center portion of the drum 92. The lower side of ring 98 rests on top of flange 96 to mount the drum 92 on the upright member 88. A second ring 102 is rigidly secured to the collar 100 and extends outward therefrom terminating at a point spaced inside of the drum's inner wall surface. A spring ring or snap ring 104 is mounted in a groove at the extreme upper end portion of the upright member 88 above the upper end of collar 100. The snap ring 104 prevents the collar 100 from being inadvertently removed from the upper end of the upright member 88. FIG. 9 shows the drum 92 in solid lines in an essentially vertical upright position which is the position it assumes when not tilted. When the drum 92 is tilted it assumes a position somewhat as shown in the dashed lines of FIG. 9 wherein one side of the flange 96 and ring 98 are in contact and the other portions are not in contact. It is to be noted that the rubbing means 80 can be tilted by exerting forces on it at any point around lower portion thereof. Tilting of the rubbing means 80 is not restricted to tilting in one direction, it can be tilted in any direction around the upright member 88.

Figure 11:
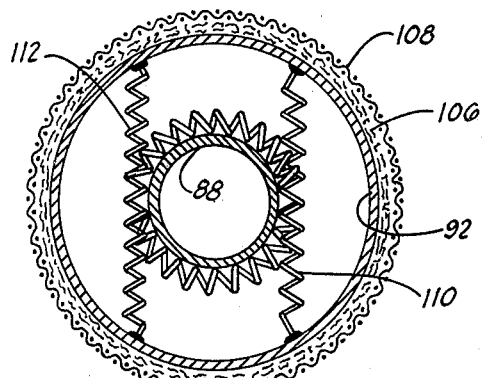
FIG. 11 is a cross-sectional view of the rubbing means and guide thereof for the livestock treater shown in FIG. 8 with the view taken on line 11—11 of FIG. 8.

The exterior of the rubbing means 80 is constructed to retain a quantity of liquid so that it can be rubbed onto the skin of an animal. The drum 92 is preferably wrapped with a layer of porous material 106 which is in turn wrapped by a layer of mesh material 108. The porous material 106 receives the liquid and retains same for the animal to rub away. The mesh material 108 protects the porous material 106 and provides a scratching surface. Preferably, the porous material 106 is a fabric of fibrous material such as jute, hemp, flax or acrylic fibers or any suitable equivalent which can be saturated with oil or the like and temporarily retain such. In practice acrylic material sometimes used for indoor/outdoor carpeting has been successfully used and such is preferred. The mesh material 108 is preferably a material that has a lattice-like appearance such as screening. In practice expanded metal screening has been successfully used and this is preferred. The rubbing means 80 has a guide in the lower portion thereof to retain the drum 92 in an essentially vertical upright position when it is not being tilted. The guide has a pair of resilient members, preferably springs, which are looped around the upright member 88 and have the ends thereof secured to the interior of the drum 92 in an opposed relation so they act in tension cooperatively to bias the drum 92 to the essentially vertical position. The springs are shown in FIGS. 8 and 11. Spring 110 has both ends thereof secured to the interior of the drum 92 in the lower portion of the FIG. 11 with the center of the spring being looped around the portion of the upright member 88 which is in the upper portion of the figure. Spring 112 is mounted with the interior of the drum 92 in opposite relation to spring 110. The springs 110 and 112 are stagered one above the other as shown in FIG. 8. Preferably, the springs 110 and 112 are substantially identical so the upright member 88 is positioned in the central portion of drum 92.

The reservoir 82 is preferably an openable container having upright sidewalls 114 in a cylindrical form, a bottom 116 and a removable top 118. The top and bottom are transverse to the upright cylindrical sidewall 114. The top 118 has a handle 120 on the top thereof and a resilient retainer inside the container to hold it in place. The resilient retainer for the top 118 is a spring 122 having a pair of links 124 and 126 attached to its ends connecting it with the top 118 and the lower portion of the container respectively. The container bottom 116 has a mount member 128 extending therefrom. The mount member 128 is slidably mounted in the hollow upper end portion of the upright member 88. Preferably, the mount 128 is in the center portion of the reservoir.

The valve assembly 84 is in the bottom portion of the reservoir 82. The valve assembly 84 has a ring 130 secured to the outside of the container bottom 116, a valve body 132 secured to the inside of the container bottom 116 in the cavity of the container, and a valve operator 134 mounted in the valve body 132. The valve body 132 has an inlet 136 adjacent to the container bottom 116. The valve operator 134 is preferably a threaded member with a pointed end portion 138 that engages a valve seat in the container bottom 116. The valve has the valve seat and an aperture through the container bottom with the seat being a beveled inlet portion of the aperture. This aperture through the container bottom 116 is communicably connected with an aperture 140 through the ring 130. The valve operator 134 has an extended handle portion 142 which can be used to rotate same and change its position in the valve seat. The position of the pointed portion 138 in the valve seat regulates the quantity of liquid which can flow through the valve. The valve ring 130 rests on a gasket 144 that is positioned on the top of the ring member 102. The gasket 144 and ring 102 serve as a valve closure member because it blocks the liquid flow through the aperture 140 when the rubbing means 80 is in the upright position. When the rubbing means 80 is tilted ring 130 is separated from gasket 144 so the outlet of the aperture 140 is uncovered and liquid can flow through the valve and into the upper end portion of the rubbing means 80. When liquid flows out of the valve assembly 84 it runs over gasket 144 and ring 102 into the cavity in the end portion of the drum 92 and from there through the outlet apertures 103 onto the exterior of the drum 92 and into the porous material 106 which surrounds the drum 92.

In the use and operation of the livestock treater 12 the reservoir 82 is filled with a liquid such as oil, insecticide, or any other liquid which is desired to be used. The valve assembly 84 is adjusted so the desired amount of liquid can flow through the valves when they are opened. When the rubbing means 80 is tilted the valve outlets on the bottom of the ring 130 are uncovered because part of ring 130 moves upward and away from gasket 144. Additionally when the drum 92 is tilted ring 102, ring 98 and collar 100 are inclined relative to the upright member 88 this causes the reservoir 82 to be raised relative to the upright member 88. The reservoir mount 128 slides upward in the interior of the upright member 88. With the drum 92 in a tilted position only a portion of the gasket 144 and ring 130 are in contact and only a portion of ring 98 and flange 96 are in contact. When the force tilting the drum is removed the weight of the reservoir pressing down on the drum through the rings retains the drum to the essentially vertical upright position. It is to be noted that tilting the drum 92 in any direction by an animal will result in raising the reservoir 82 and opening the valve or the valves of the valve assembly 84. The amount which the outlet of the aperture 140 is uncovered obviously depends upon the position of that aperture in relation to the direction which the drum 92 is being tilted. Preferably, a plurality of valves are used in the valve assembly with the valves spaced in an equal distance spaced relation around the center portion of the reservoir 82. After the livestock treater 12 has been in use for a period of time the porous material 106 covering the drum 92 will become saturated with the liquid as it is rubbed away onto the animal's skin. Any liquid which is not rubbed away onto the animal's skin drips from the bottom of the rubbing means 80 and is collected in the drip reservoir on the base 86. When the reservoir 82 is emptied it is easily refilled by removing the top 118.

FIG. 12 on Sheet 3 of the drawings shows a modification of the second described embodiment of this invention, with the modification indicated generally at 14. This modification 14 is an elevated version of the structure which enables it to be used by taller animals such as cattle. This structure 14 has a base portion indicated generally at 150 which is the only part of it that differs from the structure described in conjunction with the second embodiment, (2). For convenience and clarity the numerals identifying portions of the second embodiment, (2), are provided on FIG. 12. The base portion 150 has a base member 152 resembling a platform with a plurality of legs secured thereto in a spaced relation and extending upward with their upper end secured on the upper end portion to the upright member 88. Preferably at least three legs are used with only two of them being visible in FIG. 12. The upright member 88 is substantially elongated to support the rubbing means 80 at a point substantially above the ground. If desired the base 150 can be constructed with a drip reservoir similar to that shown in FIGS. 7 and 8 however such is not shown in FIG. 12. This structure 14 functions the same as that of the second embodiment, (2), and because it is taller it can be used by taller animals such as cattle, goats, horses, etc.

Another embodiment, (3), of the livestock treater of this invention is shown in detail in FIGS. 13–16 on sheet 4 of the drawings. Livestock treater 15 has a frame 160 that supports the rubbing means 162 with the reservoir 164 on top of rubbing means 162. A valve assembly 166 is enclosed in reservoir 164 and is in fluid communication with rubbing means 162. Rubbing means 162 is tiltably mounted on frame 160. Valve assembly 166 is constructed so that when the rubbing means is tilted fluid will flow from reservoir 164 onto the rubbing means.

Frame 160 has a hollow upright 168 rigidly mounted on a plate 170 and supported by braces. Plate 170 can be secured by bolting to a foundation or it can be bolted to the crossed support members 172 and 174 as shown in FIG. 13. When the crossed support members 172 and 174 are used anchors are used to secure it to the ground. An anchor 176 is shown in FIG. 13. On the upper end portion of hollow upright 168 a flange 178 is provided to support rubbing means 162.

Reservoir 164 is a closable container having a filler cap 180 secured to a neck 182 on the reservoir top 184. The bottom 186 of reservoir 164 has an elongated support member 188 extending from its center portion. Support member 188 is vertically movably mounted in the upper end portion of frame upright 168. Reservoir 164 can be constructed with a cylindrical sidewall 190 as shown in the drawings.

Rubbing means 162 has a top supported cross-sectionally round and hollow cylindrical member or drum 192 covered with a porous material 194. A wrapping of mesh material 196 surrounds the exterior of the porous material 194 to retain it in place and provide a rough scratching surface for animals to rub against. Preferably the porous material is a fabric of fibrous material such as jute hemp, flax or acrylic fibers. Any other suitable material can be used for the porous layer of material so long as it will retain liquids temporarily. In practice acrylic carpet covered with expanded metal screening has been used quite successfully. The support for rubbing means 162 includes a cylinder top 198 rigidly secured to cylindrical member 192 with an aperture through its center portion. This aperture fits over the upper end of upright 168 as shown in FIGS. 15 and 16. The inner portion of top 198 adjacent to the aperture rest on flange 178 to support rubbing means 162 in a depending relation. A cylindrical ring 200 is rigidly secured on top 198 at the aperture as shown in FIG. 16. A resilient gasket 202 is mounted on top of top 198 as shown in FIG. 16. Gasket 202 is constructed of a material that is substantially resilient and resistant to oil and insecticides comonly used in animal oiling and treating devices. A snap type retainer ring 204 is mounted in a groove around the upper end portion of upright 168 to retain rubbing means 162 on the upper end of upright 168. Retainer ring 204 is spaced above cylindrical ring 200 so rubbing means 162 can be tilted as illustrated in FIG. 15 but will be prevented from moving up off of the upper end of upright 168.

Valve assembly 166 includes a flow control valve mounted inside reservoir 164 and in fluid communication with a pair of outlet seats at gasket 202 for releasing liquid from the reservoir onto the exterior of rubbing means 162. Flow control valve has a valve body 206 that threadedly mounts a hollow valve closure member 208 which provides an inlet and a flow contol. The valve body 206 has an internal cavity 210 which connects to a pair of outlets 212 and 214. The inner end portion of valve closure member 208 is pointed and can rest in a conical valve seat 216. A passaway 218 through valve closure member 208 connects the outer exposed end of the valve closure member and its pointed end portion as shown in FIG. 16. Outlet 214 is threadedly mounted in an outlet seat 218 that is rigidly mounted through reservoir bottom 186. Outlet seat 218 supports valve body 206. A passageway 220 through outlet seat 218 is normally plugged by gasket 202 when rubbing means 162 is in a vertical position. Outlet 212 is connected by conduit 220 to outlet seat 222. Outlet seat 222 is positioned in an opposed relation to outlet seat 218 and it has a passageway (similar to that shown in outlet seat 218) which is normally plugged by gasket 202. Opening and closing the flow control valve is accomplished by rotating valve closure member 208. A loop 224 is secured on the outer end of valve closure member 208. A control rod 226 is mounted with loop 224 and extends into neck 182 so it can be contacted by filler cap 180. Rotation of control rod 226 inturn rotates valve closure member 208. Valve closure member 208 can be opened or closed as necessary to regulate fluid flow onto rubbing means 162. When the flow control valve is set it can be locked by tightening filler cap 180 onto the upper end of control rod 226 thereby jamming it or forcing it downward on valve closure member 208 thereby securing it in a fixed position.

When rubbing means 162 is in a vertical position outlet seats 218 and 222 both contact gasket 202. A pair of rests 230 and 232 are oppositely disposed on reservoir bottom 186 in a transverse relation to outlet seats 218 and 222 in order to balance or uniformly support rubbing means 162 in a substantially vertical position. Rubbing means 162 is supported such that a laterally oriented force at any point around it will cause tilting and uncover either one or both of outlet seats 218 and 222 to allow liquid to flow from reservoir 164.

In use and operation of livestock treater 15 reservoir 164 is filled with liquid such as oil or insecticide mixture or any other liquid which is desired to be dispensed onto the skin of livestock. Valve assembly 166 is adjusted so the desired amount of liquid can flow through seat outlets 218 and 222 when rubbing means 162 is tilted. When rubbing means 162 is tilted as shown in the solid lines in FIG. 15 the liquid from reservoir 164 runs out onto the exterior of rubbing means 162. Valve assembly 166 is constructed so that tilting rubbing means 162 in any direction will at least partially uncover one of the outlet seats to let liquid flow from reservoir 164. Once reservoir 164 is empty it can be easily refilled through cap 180.

In the manufacture of the hog oilers or the livestock treaters of this invention, it is obvious that the several embodiments thereof can be easily manufactured to achieve the end product. The livestock treaters shown herein have been in practice constructed without difficulty and in practice have been found to function as described. Obviously they can be constructed by techniques similar to that used to manufacture prior art oilers.

In the use and operation of the hog oilers or livestock treaters of this invention it is seen that same provides a livestock treater which functions very well to treat the skin of livestock with oil or other liquids. The livestock treaters shown and described herein have been constructed, used and found to be quite satisfactory in applying liquids such as oil, insecticides, etc. to the skin of animals. These livestock treaters were used with hogs and cattle.

As will become apparent from the foregoing description of the Applicant's hog oiler or livestock treater structure, relatively simple and inexpensive means have been provided to treat the skin of livestock. The structure is economical to manufacture, simple in construction, easy to use and it can be adapted for use with relatively short animals as well as taller animals.

While the invention has been constructed in conjunction with preferred specific embodiments thereof, it will be understood that this description is intended to illustrate and not to limit the scope of the invention, which is defined by the following claims.

I claim:
1. A livestock treater, comprising:
   a. a frame having an upright member mounted on a base;
   b. a reservoir mounted on an upper portion of said frame;
   c. rubbing means for providing a rubbing surface for the livestock and dispensing fluid therefrom, said rubbing means including a drum, said drum disposed around said upright member and tiltably mounted on an upper portion of said upright member, said drum including a mounting collar rigidly mounted in an upper end portion of said drum, said mounting collar substantially larger than said upright member and disposed therearound, said mounting collar including a pin attached thereto and transversely mounted through an aperture in said upright member;
   d. guide means attached to said rubbing means, said guide means supporting said rubbing means in an upright position;
   e. conduit means communicably connecting said reservoir and said rubbing means;
   f. normally closed valve means communicably connected to said conduit means, said valve means including a valve body rigidly mounted on said frame and a valve operator movably engaged in said valve body; and
   g. a valve operator contact member rigidly mounted on an upper portion of said drum, said valve operator contact member contacting said valve operator and opening said valve when said rubbing means is tilted on said frame.
2. The livestock treater of claim 1, wherein:
   a. said guide means has a guide member rigidly secured in a lower portion of said drum and having an eccentric aperture therethrough and receiving said upright member therethrough said aperture, said aperture has a portion thereof in a center portion of said drum,
   b. said guide means has a resilient member secured in a lower portion of said drum positioned around a portion of said upright member to in use position same in said named portion of said aperture,
   c. said frame means has an upright portion with said reservoir on an upper portion thereof,
   d. said upright frame portion has a collar member rigidly secured thereto in position to receive said upper end portion of said upright member, and
   e. said collar member has a flange extending therefrom mounting said valve body.
3. A livestock treater comprising:
   a. a frame having an upright member mounted on a base;
   b. a reservoir mounted on an upper portion of said frame;
   c. rubbing means for providing a rubbing surface for the livestock and dispensing fluid therefrom, said rubbing means having a drum mounted on an upper portion of said upright member by tiltable mounting means, said tiltable mounting means having a flange rigidly secured to the upper end portion of said upright member and extending outwardly therefrom and a ring rigidly secured inside an upper end portion of said drum, said ring resting on top of said flange, said ring having the inner portion thereof substantially spaced from said upright member;
   d. guide means attached to said rubbing means, said guide means supporting said rubbing means in an upright position;
   e. conduit means communicably connecting said reservoir and said rubbing means;
   f. normally closed valve means communicably connected to said conduit means, said valve means having a valve body mounted on a lower portion of said reservoir and a valve closure member rigidly mounted on an upper portion of said rubbing means, said valve body having an inlet in said reservoir and an outlet through said reservoir communicably connected to said valve closure member.
4. The livestock treater of claim 3, wherein:
   a. said ring has a collar member rigidly secured to an inner portion thereof, said valve closure member has a second ring secured to said collar member spaced from said first named ring and extending outward,
   b. said reservoir is movably mounted on said upper end portion of said upright member, said reservoir being movable upon tilting of said rubbing means, and
   c. said drum has a porous covering on the exterior thereof to in use disperse liquid onto the exterior surface of said drum.
5. The livestock treater of claim 4, wherein:
   a. said rubbing means has a pair of resilient members each having the opposed ends thereof secured to said drum on the interior thereof in a spaced relation forming a pair of loops to cooperatively bias said drum to an upright position, and
   b. said valve means has a plurality of valve bodies.
6. The livestock treater of claim 5, wherein said drum is in use supported in a substantially elevated position relative to the ground.
7. The livestock treater of claim 3, wherein:
   a. said tiltable mounting means has a flange rigidly secured to the upper end portion of said upright member and extending outward therefrom and a ring rigidly secured inside an upper end portion of said drum, said ring rests on top of said flange, b. said ring has the inner portion thereof substantially spaced from said upright member, c. said valve closure member is rigidly mounted on said ring, d. said valve means has a valve body inlet in said reservoir communicably connected with an outlet seat extending from said reservoir contacting said valve closure member and a plurality of rest members spaced relative to said outlet seat and contacting to in combination with said outlet seat support said rubbing means in an upright non-use position, and e. said reservoir being vertically movably mounted on said upright, said reservoir being raised upon tilting of said drum simultaneously with at least partially uncovering a portion of said outlet seat allowing liquid to flow from said reservoir.

8. The livestock treater of claim 7, wherein:

a. said valve means has a pair of outlet seats communicably connected with said valve body and oppositely disposed relative to said upright, and b. said valve means has a variable opening valve closure member in said valve body for regulating liquid flow from said reservoir.

9. The livestock treater of claim 8, wherein:

a. said ring has a collar member rigidly secured to an inner portion thereof and extending upward above said valve closure member, b. said reservoir is movably mounted on said upper end portion of said upright member, said reservoir being movable upon tilting of said rubbing means, and c. said valve means has a pair of rest members oppositely disposed relative to said upright and essentially equally spaced relative to said outlet seats.

10. The livestock treater of claim 9, wherein:

a. said valve closure member is a resilient ring mounted on top of said ring that is rigidly secured to said drum, b. said reservoir has a closable opening in the top thereof, and c. said variable opening valve closure member is controllable by a rod mounted thereto and extending through said opening in said reservoir.

* * * * *